United States Patent
Tran

(10) Patent No.: US 9,429,179 B2
(45) Date of Patent: Aug. 30, 2016

(54) RETAINING WAVE SPRING

(71) Applicant: Hung Duc Tran, Rosemead, CA (US)

(72) Inventor: Hung Duc Tran, Rosemead, CA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 155 days.

(21) Appl. No.: 14/080,069

(22) Filed: Nov. 14, 2013

(65) Prior Publication Data
US 2015/0132080 A1    May 14, 2015

(51) Int. Cl.
*F16B 21/18* (2006.01)
*F16B 21/10* (2006.01)
*F16F 1/32* (2006.01)

(52) U.S. Cl.
CPC .............. *F16B 21/10* (2013.01); *F16F 1/328* (2013.01)

(58) Field of Classification Search
CPC ................................. F16F 1/328; F16B 21/18
USPC ........................ 411/9–12, 517, 521, 543, 545
See application file for complete search history.

(56) References Cited

U.S. PATENT DOCUMENTS

| | | | | |
|---|---|---|---|---|
| 1,818,915 A * | 8/1931 | Vossloh | ................... | F16B 39/24 411/153 |
| 1,886,791 A * | 11/1932 | Cowlin | ................... | F16B 39/24 411/153 |
| 2,089,924 A * | 8/1937 | Legge | ..................... | F16B 39/24 267/180 |
| 2,392,718 A * | 1/1946 | Baldwin | ................... | F16B 5/10 24/687 |
| 2,683,922 A * | 7/1954 | Zion | ....................... | B21F 37/02 29/412 |
| 2,890,072 A * | 6/1959 | Kaman | ................. | F16B 21/186 279/79 |
| 3,263,728 A * | 8/1966 | Lynch | ................... | F16B 41/002 411/349 |
| 4,752,178 A * | 6/1988 | Greenhill | ................ | F16B 21/18 403/326 |
| 5,316,422 A * | 5/1994 | Coffman | ................ | B21J 15/022 411/107 |
| 5,558,393 A * | 9/1996 | Hawkins | ................. | F16F 1/328 267/148 |
| 6,068,250 A * | 5/2000 | Hawkins | ................. | F16F 1/328 267/148 |
| 6,250,618 B1 | 6/2001 | Greenhill | | |
| 6,758,465 B1 * | 7/2004 | Greenhill | ................. | F16F 1/06 267/162 |
| 2005/0103579 A1 | 5/2005 | Meernik | | |

FOREIGN PATENT DOCUMENTS

| | | |
|---|---|---|
| EP | 0303147 A1 | 2/1989 |
| GB | 903017 A | 8/1962 |
| WO | 9929548 A1 | 6/1999 |

* cited by examiner

*Primary Examiner* — Roberta Delisle
(74) *Attorney, Agent, or Firm* — King & Spalding LLP

(57) ABSTRACT

A retaining wave spring includes a first open-loop that has a wall that is substantially planar. The retaining wave spring also includes a second open-loop continuing from an end portion of the first open-loop. The second open-loop has a wall having curved portions. An outer diameter of the first open-loop and an outer diameter of the second open-loop have different sizes.

20 Claims, 6 Drawing Sheets

RETAINING WAVE SPRING

TECHNICAL FIELD

The present disclosure relates generally to an apparatus that performs the functions of a retaining ring and a wave spring, in particular to a retaining wave spring.

BACKGROUND

Retaining rings and wave springs are used in various applications. Generally, a retaining ring may be used instead of fasteners such as threaded fasteners. For example, retaining rings can be positioned in a groove of a shaft to retain an assembly attached to the shaft. To illustrate, when a retaining ring is positioned in a groove, a radially outer portion of the retaining ring remains outside of the groove and creates a retaining wall extending partially or entirely around the shaft. This retaining wall of the retaining ring extending around the shaft can prevent an assembly that is attached to the shaft from moving beyond the retaining ring. For example, the retaining wall may prevent the assembly from sliding off the shaft. Similarly, a retaining ring may be positioned in a groove that is in the inner surface of a housing. For example, a retaining ring may prevent an assembly from moving beyond a certain location within the housing. When the retaining ring is positioned in the groove, a radially inner portion of the retaining ring remains outside of the groove and creates a retaining wall within the housing that prevents an assembly from moving beyond the retaining ring. For example, the retaining wall may prevent an assembly from moving out of the housing.

In some applications, a retaining ring may be used along with a wave spring. A wave spring may be used for purposes such as absorbing shock and maintaining a force between components. A wave spring is generally made by creating waves in a flat wire. For example, the waves may be created in a coiled flat wire. The spring effect of a wave spring is produced by the waves in the walls of the wave spring. Relative to a coiled spring, a wave spring generally requires less installation space, which enables smaller devices. The number of turns of a wave spring generally depends on the amount of force that the wave spring is expected to maintain as well as space considerations.

In some applications, a wave spring may be used to maintain a force between a retaining ring and an assembly that is retained by the retaining ring. Combining a retaining ring and a wave spring into a single component may be desirable to reduce component count and, thus, to reduce cost of manufacturing two or more components.

SUMMARY

In general, the present disclosure relates to a retaining wave spring. In an example embodiment, a retaining wave spring includes a first open-loop that has a wall that is substantially planar. The retaining wave spring also includes a second open-loop continuing from an end portion of the first open-loop. The second open-loop has a wall having curved portions. An outer diameter of the first open-loop is larger than an outer diameter of the second open-loop.

In another example embodiment, a two-turn retaining wave spring includes a first open-loop having a first open end. The first open-loop has a wall that is substantially planar. The two-turn retaining wave spring further includes a second open-loop having a second open end. The second open-loop has a wall having curved portions. An outer diameter of the first open-loop is smaller than an outer diameter of the second open-loop.

In another example embodiment, a retaining wave spring includes a first open-loop that has a wall that is substantially planar. The retaining wave spring also includes a second open-loop continuing from an end portion of the first open-loop. The second open-loop has a wall having curved portions. An outer diameter of the first open-loop is smaller than an outer diameter of the second open-loop.

These and other aspects, objects, features, and embodiments will be apparent from the following description and the claims.

BRIEF DESCRIPTION OF THE DRAWINGS

Reference will now be made to the accompanying figures, which are not necessarily to scale, and wherein.

Figure 1:
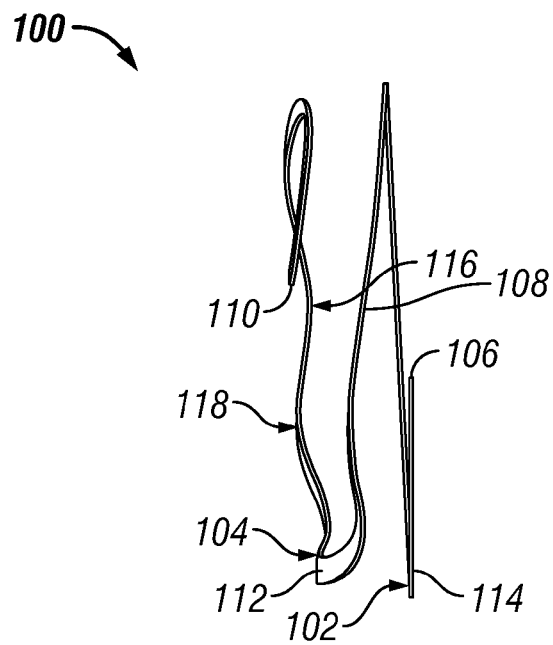
FIG. 1 is a side view of a retaining wave spring in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, reference numerals designate like or corresponding, but not necessarily identical, elements.

DETAILED DESCRIPTION OF THE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Figure 2:
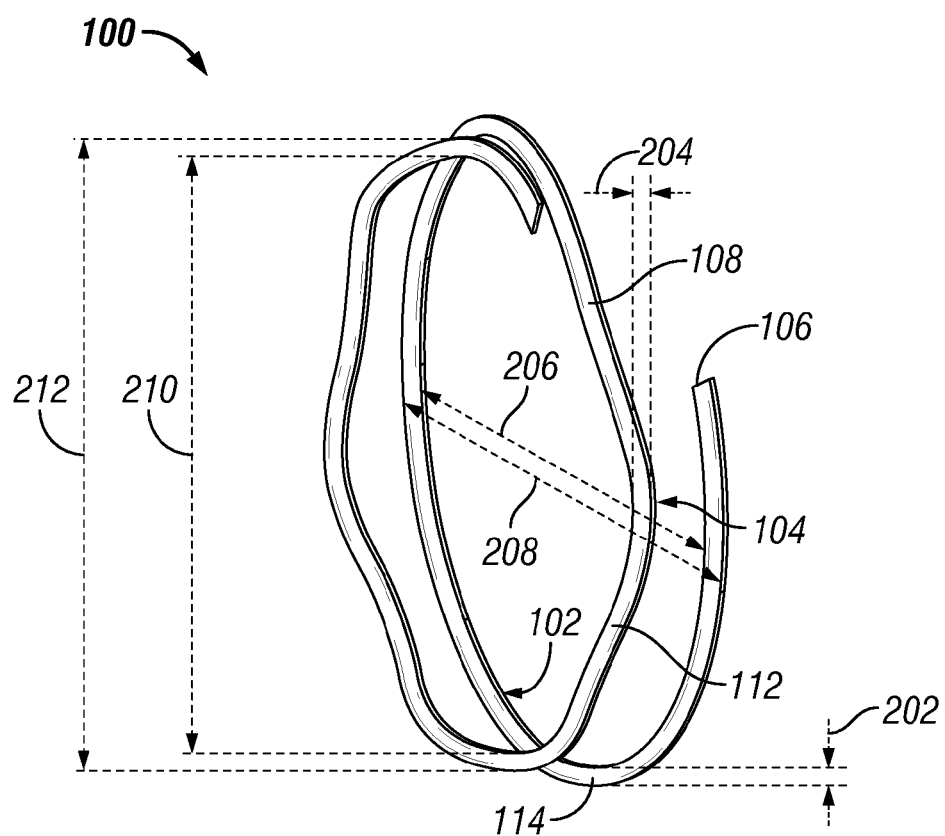
FIG. 2 is an angular view of the retaining wave spring of FIG. 1 in accordance with an example embodiment.

Turning now to the drawings, example embodiments are described. FIG. 1 is side view of a retaining wave spring 100 in accordance with an example embodiment. The retaining wave spring 100 includes a first open-loop 102 and a second open loop 104. An outer diameter of the first open-loop 102 is larger than an outer diameter of the second open-loop 104. The first open-loop 102 has a wall 114. The first open-loop 102 also has an open end 106 and an end portion 108. The first open-loop 102 extends substantially circularly from the open end 106 to the end portion 108. Although a portion of the wall 114 proximal to the end portion 108 is shown as non-planar with the remaining portion of the wall 114 in FIG. 1, in some embodiments, the wall 114 is substantially planar (as illustrated in FIG. 2) as the wall 114 extends between the open end 106 and the end portion 108. Further, in FIG. 1, although the open end 106 is not axially planar with the end portion 108, in some example embodiments, the open end 106 and the end portion 108 are substantially planar with respect to each other.

The second open-loop 104 continues from the end portion 108 of the first open-loop 102. The second open-loop 104 has a wall 112 that has a number of curved portions. In some example embodiments, the wall 112 may have two or more curved portions. The second open-loop 104 also has an open end 110. One or more of the curved portions of the wall 112 of the second open-loop 104 curve toward the wall 114 of the first open-loop 102, and one or more of the curved portions of the wall 112 of the second open-loop 104 curve away from the wall 114 of the first open-loop 102. In some example embodiments, a combination of the curved portions of the wall 112 results in a wave shape that has one or more crests 116 and one or more troughs 118. For example, the crests 116 may be considered as extending toward the wall 114 of the first open-loop 102, while the troughs 118 may be considered as extending away from the wall 114 of the first open-loop 102.

In some example embodiments, the curved portions of the wall 112 result in the a spring effect of the second open-loop 104, which makes the second open-loop 104 compressible and allows it to return to substantially its initial shape when the compressing force is removed. To illustrate, the second open-loop 104 may be sandwiched between the first open-loop 102 and another component. The component may be in contact with the wall 112 of the second open-loop 104 on the opposite side of the first open-loop 102. For example, some or all of the troughs 118 of the curved portions of the wall 112 of the second open-loop 104 may be in contact with the component while some or all of the crests 116 of the curved portions of the wall 112 are in contact with the wall 114 of the first open-loop 102. By virtue of the spring effect resulting from the curved portions, the second open-loop 104 may maintain a substantially constant force between the first open-loop 102 and the component. The amount of force the second open-loop 104 can effectively support depends on a number of factors including the type of material the second open-loop 104 is made of, the number of curved portions in the wall 114, amplitude of the crests 116 and troughs 118, amount of contact area between the wall 112 and the wall 114, and/or a combination thereof. In an example embodiment, the first open-loop 102 and the second open-loop 104 are made from a metal such as steel. For example, the first open-loop 102 and the second open-loop 104 may be made from a flat steel wire. In some alternative embodiments, the retaining wave spring 100 is made from a non-metal material such as plastic.

In some example embodiments, the first open-loop 102 is a retaining ring, and the second open-loop 104 is a wave spring. As described in more detail with respect to FIG. 3B, the retaining wave spring 100 may be positioned inside a housing (e.g., a housing 300 shown in FIG. 3A) such that the first open-loop 102 is in contact with a flange (e.g., a flange 306 shown in FIG. 3A) that is around an opening of the housing. For example, at least a portion of the wall 114 of the first open-loop 102 may be in contact with the flange of the housing. A portion of the wall 112 of the second open-loop 104 may overlap with a portion of the wall 114 of the first open-loop 102 such that the crests 116 in the curved portions of the wall 112 are in contact with the wall 114 of the first open-loop 102. Thus, when the wall 112 of the second open-loop 104 is in contact with the wall 114 of the first open-loop 102 via the crests 116, the second open-loop 104 can maintain a substantially constant force on the first open-loop 102 by virtue of the spring effect of the second open-loop 104 and minimize effects of shock or other forces.

FIG. 2 is a plain view of the retaining wave spring of FIG. 1 in accordance with an example embodiment. As illustrated in FIG. 2, the first open-loop 102 extends from the open end 106 to the end portion 108, and the second open-loop 104 continues from the end portion 108 of the first open-loop 102. In some example embodiments, the first open-loop 102 and the second open-loop 104 are non-concentric.

In some example embodiments, the wall 114 of the first open-loop 102 is substantially planar, and the wall 112 of the second open-loop 104 has curved portions as more clearly illustrated in FIG. 1. In some example embodiments, the open-end 106 may be closer or farther away from the end portion 108 than shown in FIG. 2.

As illustrated in FIG. 2, the first open-loop 102 has a width 202, and the second open-loop 104 has a width 204. In some example embodiments, the width 202 and the width 204 have the same size. In some alternative embodiments, the width 202 and the width 204 may have different sizes. The width 202 of the first open-loop 102 may be sized such that an outer radial portion of the wall 114 may be positioned in a groove (not shown), for example, on the inside wall of a housing (e.g., the housing 300 shown in FIG. 3A) while the remaining (inner) radial portion of the wall 114 remains outside the groove. The radial portion of the wall 114 that remains outside of the groove can serve as a retaining wall. Alternatively or in addition, the width 202 of the first open-loop 102 may be sized such that an outer radial portion of the wall 114 may be positioned inside a housing and against a flange that is around an opening of the housing while the remaining (inner) radial portion of the wall 114 serves as a retaining wall at the opening of the housing.

As illustrated in FIG. 2, the first open-loop 102 has an inner diameter 206 and an outer diameter 208. Similarly, the second open-loop 104 has an inner diameter 210 and an outer diameter 212. As illustrated in FIG. 2, the outer diameter 208 of the first open-loop 102 is larger than the outer diameter 212 of the second open-loop 104. In some example embodiments, the inner diameter 206 of the first open-loop 102 is smaller than the outer diameter 212 of the second open-loop 104, such that a radial portion of the wall 114 of the first open-loop 102 overlaps with a radial portion of the wall 112 of the second open-loop 104.

In some example embodiments, the inner diameter 206 of the first open-loop 102 is about 0.5 inch, and the outer diameter 208 of the first open-loop 102 is 0.6 inch while the inner diameter 210 second open-loop 104 is 0.45 inch and the outer diameter 212 is 0.55 inch. In some example embodiments of the retaining wave spring 100, the inner diameter 206 of the first open-loop 102, the outer diameter 208 of the first open-loop 102, the inner diameter 210 of the second open-loop 104, and the outer diameter 212 of the second open-loop 104 may each be in the range of less than an inch to several inches, keeping with their relative sizes with respect to each other, as described above. Further, the thickness of the wall 112 of the second open-loop 104 (which may be the same size as the thickness of the wall 114 of the first open-loop 102) may be selected to give the second open-loop 104 a desired spring effect. In some example embodiments, the thickness of each of the first open-loop 102 and the second open-loop 104 may be less than $1/100^{th}$ of an inch.

Figure 3A:
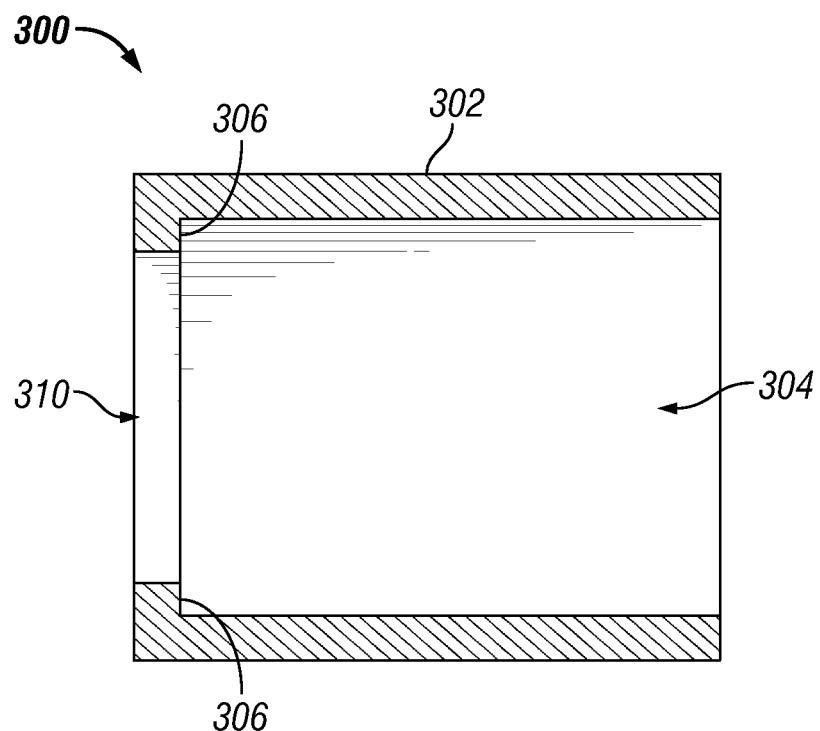
FIGS. 3A and 3B illustrate cross-sectional side views of a housing and the retaining wave spring of FIG. 1 positioned within a housing in accordance with an example embodiment.
Figure 3B:
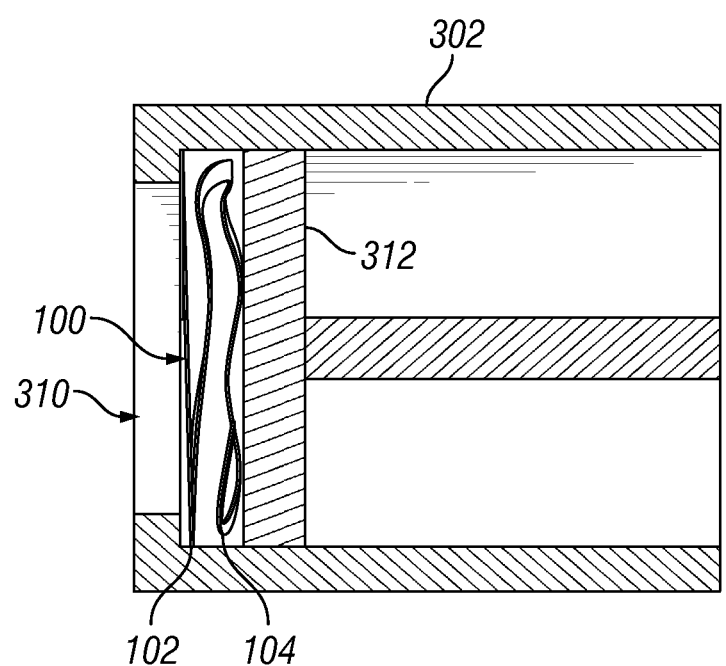

FIGS. 3A and 3B illustrate cross-sectional side views of a housing 300 and the retaining wave spring 100 of FIG. 1 positioned within the housing 300 in accordance with an example embodiment. As illustrated in FIG. 3A, the housing 300 has a wall 302 surrounding a space 304 within the housing 300. For example, the housing 300 may be a tubular housing. A flange 306 may extend around the wall 302 at an opening 310 of the housing 300. As illustrated in FIG. 3B, the retaining wave spring 100 is positioned inside the housing 300. The first open-loop 102 of the retaining wave spring 100 is positioned against the flange 306 on one side of the first open-loop 102. The second open-loop 104 is positioned such that the second open-loop 104 can maintain a constant force between the first open-loop 102 and a component 312 positioned within the housing 300.

In some alternative embodiments, the housing 300 may include a groove around the inside of the wall 302 such that an outer radial portion of the wall 114 (shown in FIGS. 1 and 2) of first open-loop 102 is positioned within the groove. Further, the first open-loop 102 and the second open-loop 104 may be reversed such that the second open-loop 104, instead of the second open-loop 104, is in contact with the flange 306. Furthermore, the opening 310 may be replaced by a wall such that the second open-loop 104 is positioned against a wall instead of the flange 306 when the positioning of the first open-loop 102 and the second open-loop 104 is reversed from what is shown in FIG. 3B. Although the retaining wave spring 100 is illustrated in FIG. 3B with respect to a particular housing, in alternative embodiments, the retaining wave spring 100 may be used in various applications including connectors, such as electrical connectors. The retaining wave spring 100 performs the functions of both a retaining ring and a wave spring, and thus reduces component count and cost in applications that ordinarily use two separate components to perform the functions of the retaining ring and a wave spring.

Figure 4:
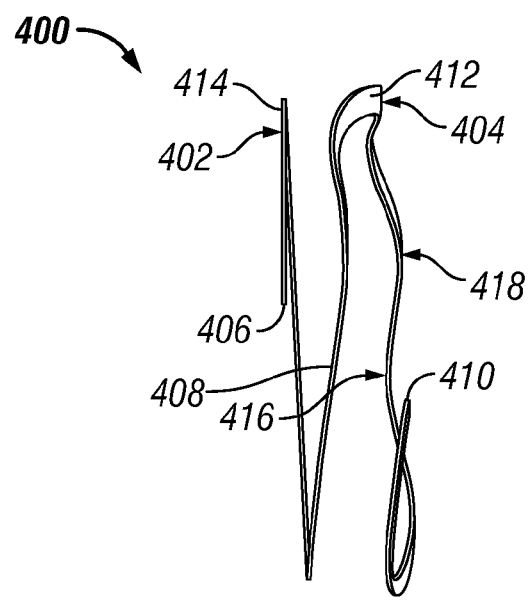
FIG. 4 is a side view of a retaining wave spring in accordance with another example embodiment.
Figure 5:
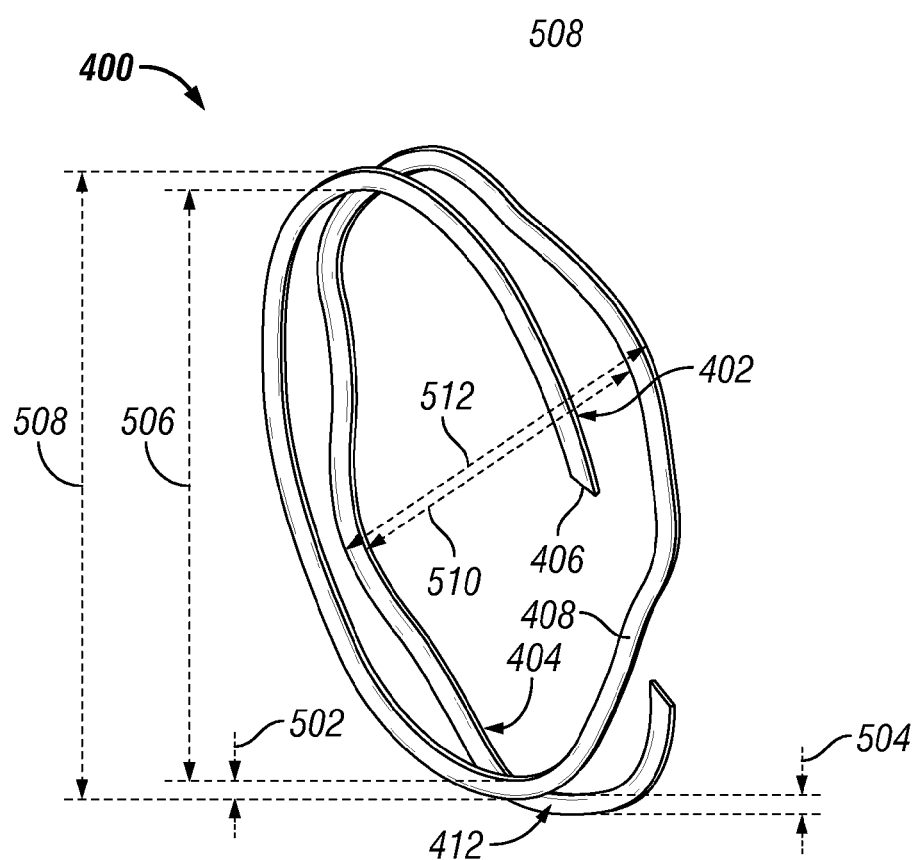
FIG. 5 is an angular view of the retaining wave spring of FIG. 4 in accordance with an example embodiment.

FIG. 4 is side view of a retaining wave spring 400 in accordance with an example embodiment. The retaining wave spring 400 includes a first open-loop 402 and a second open loop 404. An outer diameter of the first open-loop 402 is smaller than an outer diameter of the second open-loop 404. The first open-loop 402 has a wall 414. The first open-loop 402 also has an open end 406 and an end portion 408. The first open-loop 402 extends substantially circularly from the open end 406 to the end portion 408. Although a portion of the wall 414 proximal to the end portion 408 is shown in FIG. 4 as non-planar with the remaining portion of the wall 414, in some embodiments, the wall 414 is substantially planar (as illustrated in FIG. 5) as the wall 414 extends between the open end 406 and the end portion 408. Further, in FIG. 4, although the open end 406 is not axially planar with the end portion 408 in FIG. 4, in some example embodiments, the open end 406 and the end portion 408 are substantially planar with respect to each other.

The second open-loop 404 continues from the end portion 408 of the first open-loop 402. The second open-loop 404 has a wall 412 that has a number of curved portions. The second open-loop 404 also has an open end 410. One or more of the curved portions of the wall 412 of the second open-loop 404 curve toward the wall 414 of the first open-loop 402, and one or more of the curved portions of the wall 412 of the second open-loop 404 curve away from the wall 414 of the first open-loop 402. In some embodiments, a combination of the curved portions of the wall 412 results in a wave shape that has one or more crests 416 and one or more troughs 418. For example, the crests 416 may be considered as extending toward the wall 414 of the first open-loop 402, while the troughs 418 may be considered as extending away from the wall 414 of the first open-loop 402.

In some example embodiments, the curved portions of the wall 412 result in the a spring effect of the second open-loop 404, which makes the second open-loop 404 compressible and allows it to return to substantially its initial shape when the compressing force is removed. To illustrate, the second open-loop 404 may be sandwiched between the first open-loop 402 and another component. The component may be in contact with the wall 414 of the second open-loop 404 on the opposite side of the first open-loop 402. For example, the troughs 418 of the curved portions of the wall 412 of the second open-loop 404 may be in contact with the component while the crests 416 of the curved portions of the wall 412 are in contact with the wall 414 of the first open-loop 402. By virtue of the spring effect resulting from the curved portions, the second open-loop 404 may maintain a substantially constant force between the first open-loop 402 and the component. The amount of force the second open-loop 404 can effectively support depends on a number of factors including the type of material the second open-loop 404 is made of, the number of curved portions in the wall 414, amplitude of the crests 416 and troughs 418, amount of contact area between the wall 412 and the wall 414, and/or a combination thereof. In an example embodiment, the first open-loop 402 and the second open-loop 404 are made from a metal such as steel. For example, the first open-loop 402 and the second open-loop 404 may be made from a flat steel wire. In some alternative embodiments, the retaining wave spring 400 is made from a non-metal material such as plastic.

In some example embodiments, the first open-loop 402 is a retaining ring, and the second open-loop 404 is a wave spring. As described in more detail with respect to FIG. 6B, the retaining wave spring 400 may be positioned on the outside of a shaft (e.g., the shaft 600 shown in FIG. 6A) such that the first open-loop 402 is partially inserted in an external groove (e.g., the groove 602 shown in FIG. 6A) of the shaft while the second open-loop 404 extends around the outer circumference of the shaft next to the first open-loop 402. For example, an inner radial portion of the wall 414 of the first open-loop 402 may be positioned within the groove while the remaining (outer) radial portion of the wall 414 is outside of the groove. A portion of the wall 412 of the second open-loop 404 may overlap with a portion of the wall 414 of the first open-loop 402, such that the crests 416 are in contact with the wall 414 of the first open-loop 402. Thus, when of the wall 412 of the second open-loop 404 is in contact with the wall 414 of the first open-loop 402 via the crests 416, the second open-loop 404 can maintain a substantially constant force on the first open-loop 402 by virtue of the spring effect of the second open-loop 404 and minimize effects of shock or other forces.

FIG. 5 is a plain view of the retaining wave spring of FIG. 4 in accordance with an example embodiment. As illustrated in FIG. 5, the first open-loop 402 extends from the open end 406 to the end portion 408, and the second open-loop 404 continues from the end portion 408 of the first open-loop 402. In some example embodiments, the first open-loop 402 and the second open-loop 404 are non-concentric.

In some example embodiments, the wall 414 of the first open-loop 402 is substantially planar, and the wall 412 of the second open-loop 404 has curved portions as more clearly illustrated in FIG. 4. In some example embodiments, the open-end 406 may be closer or farther away from the end portion 408 than shown in FIG. 5.

As illustrated in FIG. 5, the first open-loop 402 has a width 502, and the second open-loop 404 has a width 504. In some example embodiments, the width 502 and the width 504 have the same size. In some alternative embodiments, the width 502 and the width 504 may have different sizes.

As illustrated in FIG. 5, the first open-loop 402 has an inner diameter 506 and an outer diameter 508. Similarly, the second open-loop 404 has an inner diameter 510 and an outer diameter 512. As illustrated in FIG. 5, the outer diameter 508 of the first open-loop 402 is smaller than the outer diameter 512 of the second open-loop 404. In some example embodiments, the inner diameter 510 of the second open-loop 404 is smaller than the outer diameter 508 of the first open-loop 402, such that a radial portion of the wall 414 of the first open-loop 402 overlaps with a radial portion of the wall 412 of the second open-loop 404.

The inner diameter 506 of the first open-loop 402 may be sized such that the first open-loop 402 may be positioned around a groove of, for example, a shaft. The width 502 of the first open-loop 402 may be sized such that an inner radial portion of the wall 414 may be positioned in the groove while the remaining (outer) radial portion of the wall 414 remains outside the groove. The outer radial portion of the wall 414 that remains outside of the groove can serve as a retaining wall. The inner diameter 510 of the second open-loop 404 may be sized such that the second open-loop 404 may be positioned around an outer circumference of the shaft. The width 504 of the second open-loop 404 may be sized such that a radial portion of the wall 412 overlaps with the outer radial portion of the wall 414 of the first open-loop 402 that is outside of the groove of the shaft. For example, the crests 416 in the wall 412 of the second open-loop 404 may be in contact with the outer radial portion of the wall 414 of the first open-loop 402.

In some example embodiments, the inner diameter 506 of the first open-loop 402 is about 0.5 inch, and the outer diameter 508 of the first open-loop 402 is 0.6 inch while the inner diameter 510 second open-loop 404 is 0.55 inch and the outer diameter 512 is 0.65 inch. In some example embodiments of the retaining wave spring 400, the inner diameter 506 of the first open-loop 402, the outer diameter 508 of the first open-loop 402, the inner diameter 510 of the second open-loop 404, and the outer diameter 512 of the second open-loop 404 may each be in the range of less than an inch to several inches, keeping with their relative sizes with respect to each other, as described above. Further, the thickness of the wall 412 of the second open-loop 404 (which may be the same size as the thickness of the wall 414 of the first open-loop 402) may be selected to give the second open-loop 404 a desired spring effect. In some example embodiments, the thickness of each of the first open-loop 402 and the second open-loop 404 may be less than $1/100^{th}$ of an inch.

Figure 6A:
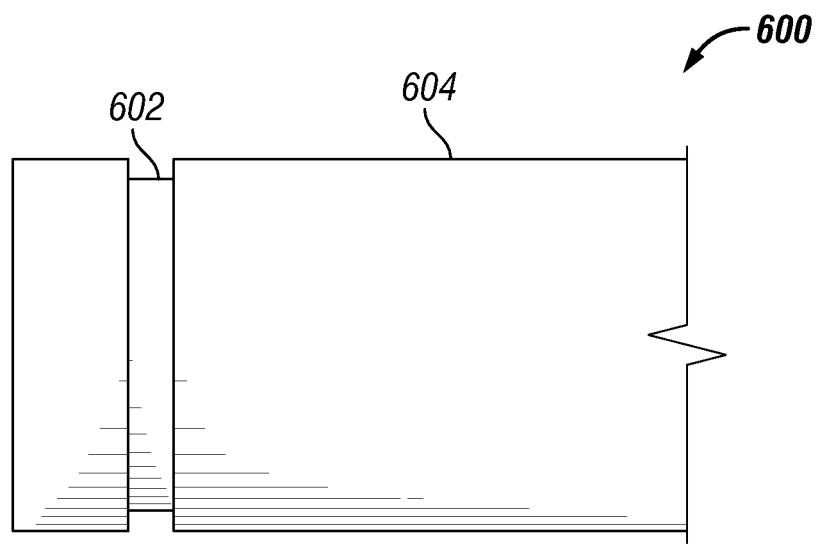
FIGS. 6A and 6B illustrate side views of a shaft and the retaining wave spring of FIG. 4 positioned around the shaft in accordance with an example embodiment.
Figure 6B:
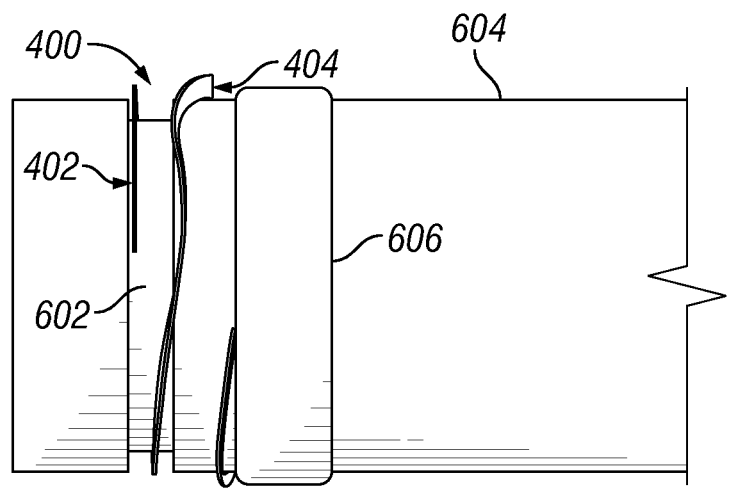

FIGS. 6A and 6B illustrate side views of a shaft and the retaining wave spring 400 of FIG. 4 positioned around the shaft in accordance with an example embodiment. As illustrated in FIG. 6A, the shaft 600 has a wall 604. For example, the shaft 600 may be a cylindrical shaft. The shaft 600 also includes a groove 602 around the circumference of the shaft 600. As illustrated in FIG. 6B, the retaining wave spring 400 may be positioned around the shaft 600. The first open-loop 402 may be positioned in the groove 602 such that an outer radial portion of the wall 414 (shown in FIGS. 4 and 5) of the first open-loop 402 extends outside of the groove 602 beyond the surface of the wall 604. The second open-loop 404 is positioned outside of the groove and around the outer circumference of the shaft 600. As illustrated in FIG. 6B, an inner radial portion of the second open-loop 404 axially overlaps with the outer radial portion of the first open-loop 402 that extends beyond the surface of the wall 604 of the shaft 600. For example, the crests 416 (shown in FIG. 4) of the wall 412 of the second open-loop 404 may be in contact with outer radial portion of the wall 414 extending outside of the groove 602, and the troughs 418 (shown in FIG. 4) of the wall 412 of the second open-loop 404 may be in contact another component 606. Thus, the second open-loop 404 is positioned such that the second open-loop 404 can maintain a constant force between the first open-loop 404 and the component 606.

Although the retaining wave spring 400 is illustrated in FIG. 6B with respect to a shaft, in alternative embodiments, the retaining wave spring 400 may be used in various applications including connectors, such as electrical connectors, that may include solid or hollow components instead of the shaft 600. The retaining wave spring 600 performs the functions of both a retaining ring and a wave spring, and thus reduces component count and cost in applications that ordinarily use two separate components to perform the functions of the retaining ring and a wave spring.

Figure 7:
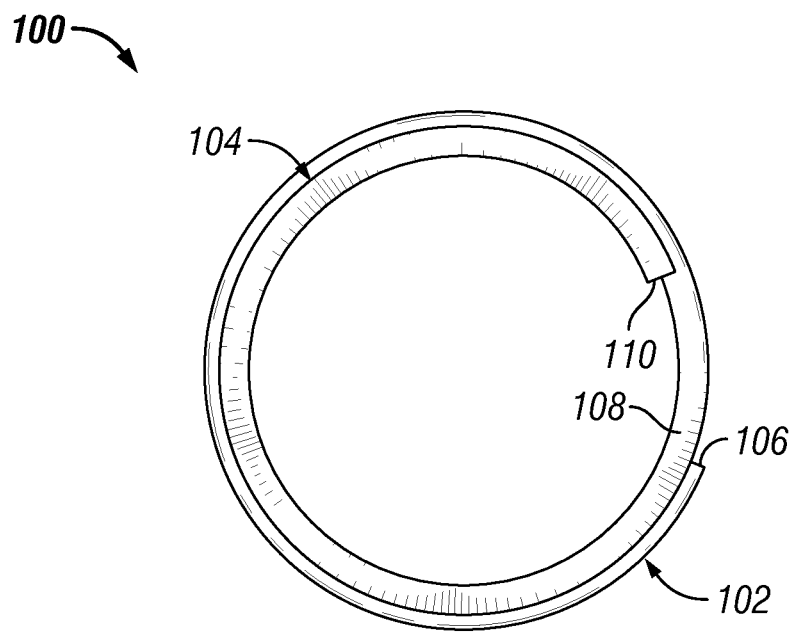
FIG. 7 illustrates a front view of the retaining wave spring of FIG. 1 in accordance with an example embodiment.

FIG. 7 illustrates a front view of the retaining wave spring 100 of FIG. 1 in accordance with an example embodiment. As illustrated in FIG. 7, the retaining wave spring 100 includes the first open-loop 102 and the second open-loop 104. The first open-loop 102 extends substantially circularly from the open end 106 to the end portion 108. The second open-loop 104 continues from the end portion 108 of the first open-loop 102 and extends substantially circularly to the open end 110. As illustrated in FIG. 7, the first open-loop 102 has a larger outer diameter than the second open-loop 104.

Figure 8:
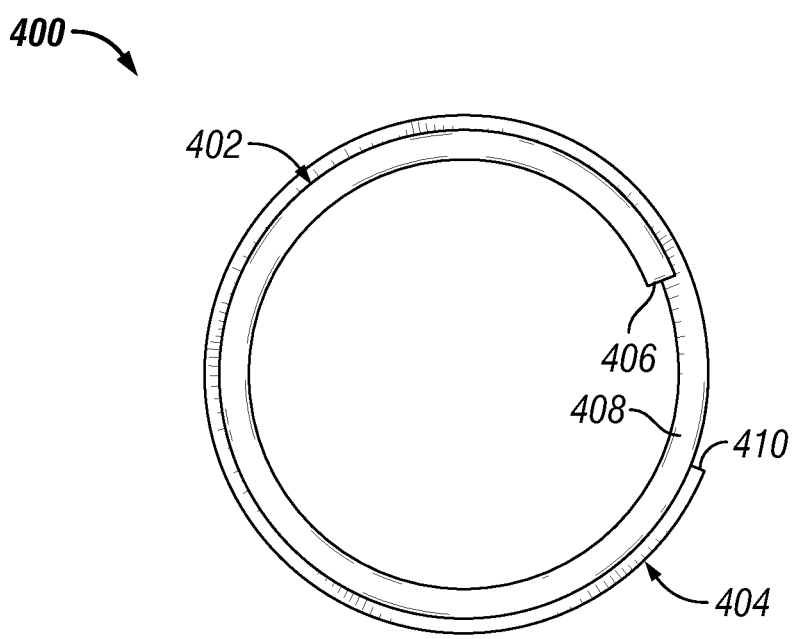
FIG. 8 illustrates a front view of the retaining wave spring of FIG. 4 in accordance with an example embodiment.

FIG. 8 illustrates a front view of the retaining wave spring 400 of FIG. 4 in accordance with an example embodiment. As illustrated in FIG. 8, the retaining wave spring 400 includes the first open-loop 404 and the second open loop 1404. The first open-loop 402 extends substantially circularly from the open end 406 to the end portion 408. The second open-loop 404 continues from the end portion 408 of the first open-loop 402 and extends substantially circularly to the open end 410. As illustrated in FIG. 8, the first open-loop 402 has a smaller outer diameter than the second open-loop 404.

Figure 9:
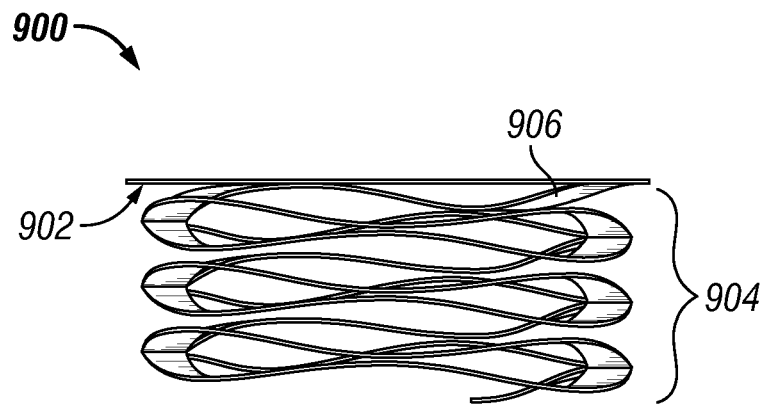
FIG. 9 illustrates a retaining wave spring in accordance with another example embodiment.

FIG. 9 illustrates a retaining wave spring 900 in accordance with another example embodiment. The retaining wave spring 900 includes an open-loop 902 and multiple loops 904. The open-loop 902 is substantially circular and has a wall that is substantially planar. The multiple loops 904 continue from the open-loop 902. To illustrate, the first loop of the multiple loops 904 continues from the open-loop 902, and each successive loop of the multiple loops 904 continues from the preceding loop of the multiple loops 904. A first loop 906 of the multiple loops 904 continues from the open-loop 902 in a similar manner described with respect to the second open-loop 104 and the first open-loop 102 of FIG. 1. Each loop of the multiple loops 904 has curved portions. In some example embodiments, corresponding crests of two adjacent loops of the multiple loops 904 may be in contact as illustrated in FIG. 9.

As illustrated in FIG. 9, an outer diameter of the open-loop 902 is larger than an outer diameter of each loop of the multiple loops 904. The loops of the multiple loops 904 may have the same size in diameter. In some example embodiments, another loop (not shown) that is similar to the open-loop 902 may continue from the last loop of the multiple loops 904.

In some example embodiments, the first open-loop 902 corresponds to the first open-loop 102 of FIG. 1, and each loop of the multiple loops 904 corresponds to the second open-loop 104 of FIG. 1. Further, the retaining wave spring 900 may be used for similar purposes and in substantially the same manner described with respect to the retaining wave spring 100.

Figure 10:
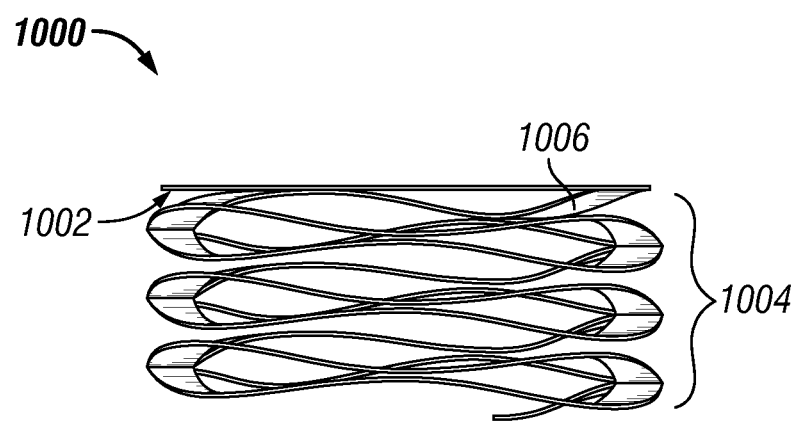
FIG. 10 illustrates a retaining wave spring in accordance with another example embodiment.

FIG. 10 illustrates a retaining wave spring 1000 in accordance with another example embodiment. The retaining wave spring 1000 includes an open-loop 1002 and multiple loops 1004. The open-loop 1002 is substantially circular and has a wall that is substantially planar. The multiple loops 1004 continue from the open-loop 1002. To illustrate, the first loop of the multiple loops 1004 continues from the open-loop 1002, and each successive loop of the multiple loops 1004 continues from the preceding loop of the multiple loops 1004. The first loop 1006 of the multiple loops 1004 continues from the open-loop 1002 in a similar manner described with respect to the second open-loop 104 and the first open-loop 102 of FIG. 1. Each loop of the multiple loops 704 has curved portions. In some example embodiments, corresponding crests of two adjacent loops of the multiple loops 1004 may be in contact as illustrated in FIG. 10.

As illustrated in FIG. 10, an outer diameter of the open-loop 1002 is smaller than an outer diameter of each loop of the multiple loops 1004. The loops of the multiple loops 1004 may have the same size in diameter. In some example embodiments, another loop (not shown) that is similar to the open-loop 1002 may continue from the last loop of the multiple loops 1004.

In some example embodiments, the first open-loop 1002 corresponds to the first open-loop 402 of FIG. 4, and each loop of the multiple loops 1004 corresponds to the second open-loop 404 of FIG. 4. Further, the retaining wave spring 1000 may be used for similar purposes and in substantially the same manner described with respect to the retaining wave spring 400.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A retaining wave spring, comprising:
    a first open-loop, wherein the first open-loop has a wall that is substantially planar; and
    a second open-loop continuing from an end portion of the first open-loop, wherein the second open-loop has a wall having curved portions, and wherein an outer diameter of the first open-loop is larger than an outer diameter of the second open-loop.

2. The retaining wave spring of claim 1, wherein the first open-loop is designed to be positioned against an inside surface of a housing proximal to an opening of the housing.

3. The retaining wave spring of claim 2, wherein a portion of the wall of the first open-loop is designed to be positioned within a groove of the housing.

4. The retaining wave spring of claim 1, wherein the first open-loop and the second open-loop are non-concentric, wherein a first horizontal axis extending through a center of the first open-loop and a second horizontal axis extending through a center of the second open-loop are vertically offset from each other.

5. The retaining wave spring of claim 4, wherein a portion of the wall of the first open-loop overlaps with a portion of the wall of the second open-loop.

6. The retaining wave spring of claim 1, wherein the first open-loop is a retaining ring and wherein the second open-loop is a wave spring.

7. The retaining wave spring of claim 1, wherein the retaining wave spring is made from steel.

8. The retaining wave spring of claim 1, wherein a difference between an outer diameter of the first open-loop and an inner diameter of the first open-loop is substantially equal to a difference between an outer diameter of the second open-loop and an inner diameter of the second open-loop.

9. The retaining wave spring of claim 1, wherein an inner diameter of the first open-loop is smaller than the outer diameter of the second open-loop.

10. A retaining wave spring, comprising:
    a first open-loop, wherein the first open-loop has a wall that is substantially planar; and
    a second open-loop continuing from an end portion of the first open-loop, wherein the second open-loop has a wall having curved portions, and wherein an outer diameter of the first open-loop is smaller than an outer diameter of the second open-loop.

11. The retaining wave spring of claim 10, wherein a portion of the wall of the first open-loop is designed to be positioned within a groove of a shaft.

12. The retaining wave spring of claim 10, wherein the first open-loop and the second open-loop are substantially non-concentric, wherein a first horizontal axis extending through a center of the first open-loop and a second horizontal axis extending through a center of the second open-loop are vertically offset from each other.

13. The retaining wave spring of claim 12, wherein a portion of the wall of the first open-loop overlaps with a portion of the wall of the second open-loop.

14. The retaining wave spring of claim 10, wherein the first open-loop is a retaining ring and wherein the second open-loop is a wave spring.

15. The retaining wave spring of claim 10, wherein the retaining wave spring is made from steel.

16. The retaining wave spring of claim 10, wherein a difference between an outer diameter of the first open-loop and an inner diameter of the first open-loop is substantially equal to a difference between an outer diameter of the second open-loop and an inner diameter of the second open-loop.

17. The retaining wave spring of claim 10, wherein an inner diameter of the second open-loop is smaller than the outer diameter of the first open-loop.

18. A two-turn retaining wave spring, comprising:
    a first open-loop having a first open end, wherein the first open-loop has a wall that is substantially planar; and
    a second open-loop having a second open end, the second open-loop continuing from an end portion of first open-loop, wherein the second open-loop has a wall having curved portions, wherein an inner diameter of the first open-loop is different from an inner diameter of the second open-loop.

19. The two-turn retaining wave spring of claim 18, wherein the inner diameter of the first open-loop is smaller than an outer diameter of the second open-loop, and wherein the outer diameter of the first open-loop is larger than the outer diameter of the second open-loop.

20. The two-turn retaining wave spring of claim 18, wherein the inner diameter of the second open-loop is smaller than an outer diameter of the first open-loop, and wherein the outer diameter of the second open-loop is larger than the outer diameter of the first open-loop.

\* \* \* \* \*